United States Patent [19]

Krohn

[11] 4,270,650

[45] Jun. 2, 1981

[54] PROCESS AND APPARATUS FOR THE ALIGNING OF FISH

[75] Inventor: Manfred Krohn, Bad Schwartau, Fed. Rep. of Germany

[73] Assignee: Nordischer Maschinenbau Rud. Baader GmbH & Co. KG, Lübeck, Fed. Rep. of Germany

[21] Appl. No.: 105,640

[22] Filed: Dec. 20, 1979

[51] Int. Cl.³ .................. B65G 15/14; B65G 47/24
[52] U.S. Cl. .......................... 198/388; 17/55; 198/483; 198/576; 198/611; 198/626
[58] Field of Search ............. 198/388, 383, 626, 836, 198/611, 576, 483; 17/55, 56, 58

[56] References Cited

U.S. PATENT DOCUMENTS

| | | | |
|---|---|---|---|
| 2,322,831 | 6/1943 | Danielsson | 17/58 |
| 2,962,606 | 12/1958 | Schlichting | 198/626 |
| 2,917,772 | 12/1959 | Schlicting | 17/55 |
| 3,002,605 | 10/1961 | Schlicting | 198/836 X |

FOREIGN PATENT DOCUMENTS

| | | | |
|---|---|---|---|
| 1293416 | 4/1969 | Fed. Rep. of Germany | 17/55 |
| 91520 | 4/1958 | Norway | 17/55 |

Primary Examiner—James L. Rowland
Attorney, Agent, or Firm—Edward F. Levy

[57] ABSTRACT

A process and an apparatus are proposed for the aligning of fish, especially those to be reckoned as belonging to the *gadidae* species, in respect of the position of their planes of symmetry. Beheaded fish are cyclically loaded on a feeding device of a pair of conveyor belts, which are disposed to have runs facing each other and which together with a bottom belt form a feed chute. The bottom belt is provided with support elements, extending in the direction of conveyance of the fish and arranged at a spacing from one another. The support elements are provided with convex support surfaces projecting up into the feed chute. The charging of the fish takes place so that each fish is caught at its abdominal cavity by a support element. The fish is fed to a holding-down member such as a profiled roller, which by pressing-down effects an arching-in of the abdominal ceiling until the underside of the vertebral projections indirectly bears through the abdominal ceiling, and an exact alignment of the fish thus takes place so that the further effective processing thereof is made possible with highest yield.

11 Claims, 4 Drawing Figures

PROCESS AND APPARATUS FOR THE ALIGNING OF FISH

BACKGROUND OF THE INVENTION

1. Field of the Invention

The invention concerns a process for performing the alignment of beheaded fish, in particular fish with cross-section approximating to circular shape such as fish of the various *gadidae* species, in respect of the position of its plane of symmetry with conveying support of the fish body at its belly, back and flanks, as well as an apparatus for the performance of such process.

2. Description of the Prior Art

In the mechanical fish processing, it is an unavoidable prerequisite not only for the fulfilment of the requirements in respect of the quality of the products, but also for the assurance of an automatic course of the treatment process as free from faults as possible that each fish be fed exactly aligned to the processing line and that this state remain securely maintained during the entire processing. This concerns particularly the alignment in respect of the position of the plane of symmetry of the fish. With fish of a cross-section approximating to a circular shape, this requirement is particularly difficult to realize, because a fish so structured affords no possibility of obtaining the desired effect with the usual aligning means engaging from outside.

Such an apparatus is evident from Norwegian Pat. No. 91 520. It shows a pair of driven conveyor belts, which together with a bottom belt form a feed chute, as well as hold-down means above the bottom band. This apparatus is merely suiable with good results to align fish of the shape of a cross-section similar to an ellipse in respect of the position of its plane of symmetry.

OBJECT OF THE INVENTION

It is an object of the present invention to provide for a process and an apparatus for the aligning of fish of a cross-section approximating to the circular shape, under the application of which an aligment of such fish is made possible securely in respect of the position of the plane of symmetry and with at least the coventionally desired efficiency.

SUMMARY OF THE INVENTION

According to the invention, there is proposed a method for aligning beheaded fish, in particular fish with a cross-section approximating to circular shape such as fish of the various *gadidae* species, in respect of the position of its plane of symmetry, with conveying support of the fish body at its belly, back and flanks, wherein the support at the belly of the fish is performed by inwardly arching the abdominal walls enclosing the abdominal cavity up to nearly the bearing of their insides against the undersides of the vertebral projections.

The advantages attainable thereby consist particularly in that through the indirect support of the skeleton of the fish, a centering support is created for the straightening of setting-up thereof, which makes possible an exact alignment.

To achieve the above object, the invention also proposes an apparatus for performing an alignment of beheaded fish, in particular fish with a cross-section approximating to circular shape such as fish of the various *gadidae* species, in respect of the position of its plane of symmetry, with conveying support of the fish body at its belly, back and flanks, the apparatus comprising feeding means including a pair of rotatingly driven conveyor belts and a bottom belt to form a feed chute, a charging device including transversely arranged troughs above said feed chute, and a hold-down member arranged above said bottom belt, wherein the bottom belt is provided with support elements, which extend in a longitudinal direction with respect to the conveyance of the fish, are arranged at a spacing from one another, and project upwardly into said feed chute.

This apparatus forms a particularly advantageous and constructively simple possibility to align the skeleton of fish having an approximately circular shaped cross-section for further processing, e.g. by filleting.

Expediently, the support elements form a support surface constructed convexly and in symmetry with the axis of symmetry of the feed chute. In consequence of such an adaptation of the support surface to the shape of the abdominal cavity of a fish immediately below the vertebral column, an unambiguous seating and support is assured.

According to another embodiment of the invention, the support surface may be constructed as part of the envelope of a cylinder, the diameter of which nearly corresponds to the spacing, measured in the plane of the bottom belt, of the conveyor belts forming the feed chute. Thereby, the coarse alignment of the fish rump is made possible already after the throwing-down thereof into the feed chute.

In order to assure that the abdominal cavity be supported over its entire length and an alignment of the fish thereby safeguarded also in respect of the position of its longitudinal axis, the length of the support surface may correspond to at least the length of the abdominal cavity of the largest fish coming to be processed.

According to still another embodiment of the invention, the support elements are arranged at a spacing from one another, which corresponds to at least the length of the tail part of the largest fish coming to be processed. In that case, the parts of the bottom belt, which are disposed between the support elements are stepped to a lower height relative to the support surfaces and form a trough-shaped structure of V-shaped cross-section. Thereby, it is made possible also to guide the tail part of the fish aligned at least in respect of its longitudinal axis, which is of great importance for the automatic transfer of the fish to further processing.

According to yet a further embodiment, the charging device and the feeding device may be synchronized in respect of their conveying speeds. After once mating the throwing-down instant of the fish rumps through the transverse troughs of the charging device with the passage of the end of the support elements for the abdominal cavity, it is thereby ensured that each fish rump after its throwing-down into the feeding device so comes to lie that the end of the abdominal cavity will co-incide with the end of the respective support element to a sufficiently exact extent.

Preferably, the holding-down member may be arranged in the proximity of the outlet end of the feed chute and consist of a profiled roller of a V-shape track profile driven at a peripheral speed corresponding to at least the spped of the conveyor belts and constructed to be biassed upwardly, advantageously deflectable against the force of a spring. Thus, care is taken of a sufficient holding-down pressure for the inward arching of the abdominal cavity of the fish up to the supporting of the vertrebral appendages of its skeleton on the support elements as well as of a then effective three-point guidance, which secures the exact alignment.

According to a further embodiment, a resiliently biassed guide for holding down the tail part of the fish is arranged downstream of the holding-down member. Consequently, also the tail part of the fish may be guided safely, after, otherwise, the guiding could only be performed unsatisfactorily because of the smaller cross-section of the fish in the tail region compared with the larger cross-section in the region of the abdominal cavity.

Furthermore, the bottom belt may be extended up into a succeeding processing machine, while the support elements may be constructed as thrust or push saddles. Thus, the apparatus according to the invention is suitable also for the transfer of fish, which are processed in a succeeding processing machine while being conveyed tail end leading.

BRIEF DESCRIPTION OF THE DRAWINGS

Other and further objects of the present invention will be apparent from the following description and claims and are illustrated in the accompanying drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the schematic drawings.

DETAILED DESCRIPTION OF THE PREFERRED EMBODIMENT

Figure 2:
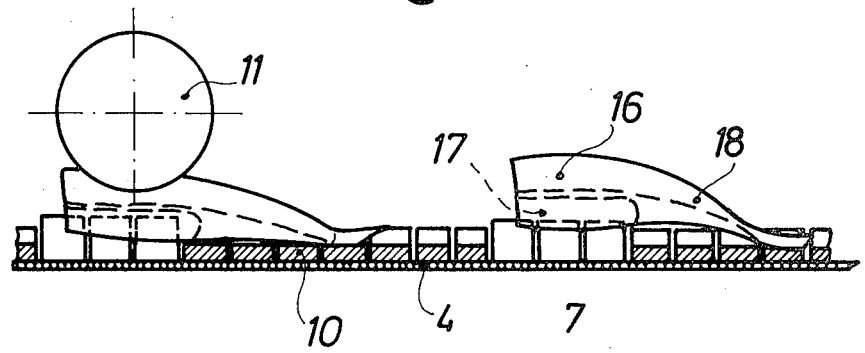
FIG. 2 shows a longitudinal section through the feeding means, leaving out the conveyor belts.
Figure 3:
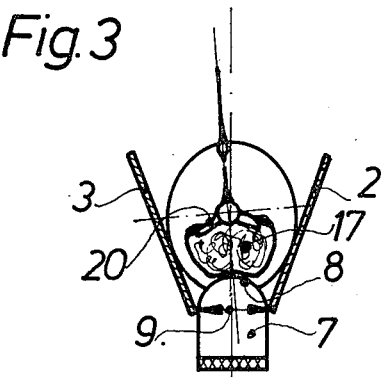
FIG. 3 shows a cross-section through the feeding means in the region of the lateral conveyor belts with a fish just arrived in the feed chute before its alignment and seen from its beheading-cut face.
Figure 4:
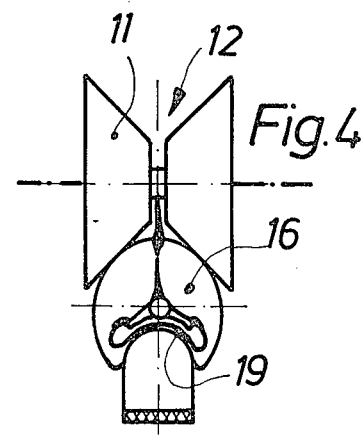
FIG. 4 shows a cross-section through the feed chute in the region of the holding-down member with an aligned fish seen from its beheading-cut face.

In a frame (not shown) of a fish processing machine, for example a filleting machine, a feeding device 1 for the fish is arranged in front of and preferably in prolongation of the fish path of this machine and comprises a pair of rotatingly driven conveyor belts 2 and 3 guided in a parallel direction to each other. Their conveying runs are facing each other and together with a likewise circulatingly driven bottom belt 4 form a feed chute 6 for receiving the fish. The bottom belt 4 is at its downstream end 5 prolonged compared with the conveyor belts 2, 3 and carries support elements 7, which are arranged at equal spacings from one another along the bottom belt 4 and in the longitudinal direction on the periphery of the latter, and which at their part projecting up into the feed chute 6 comprise a support surface 8 of convex structures. Preferably, the support surface 8 is part of the envelope of a cylinder, the axis of which lies in the plane of symmetry of the feed chute 6 and the diameter 9 of which is a little smaller than the spacing, measured in the plane of the bottom belt 4, of the conveyor belts 2, 3. In the regions between the support elements, the bottom belt 4 is structured in trough-shape in such a manner that a receptacle 10 extending in the longitudinal direction of the bottom belt 4 is formed having V-shaped cross-section. The receptacle 10 is arranged stepped to a lower height relative to the support surface 8. The support elements 7 as well as also the receptacles 10 may comprise a flexible material which makes possible their elastic deflection during their circulation. They may however, also comprise rigid materials and may comprise individual segments mounted on a chain or a belt, so that e.g. (see FIG. 2) a number of three of one type of segments arranged adjacent one another form one support element 7, while a number of seven of a second type of segments also arranged adjacent one another form said receptacle 10.

Disposed above the downstream end 5 of the bottom belt 4 is a profile roller 11, which is provided with a V-shaped track profile 12, circulatingly driven at a speed equal to or slightly greater than the speed of the conveyor belts 2, 3 and which is mounted in the plane of symmetry of the feed chute 6 to be deflectable upwardly against the force of a spring. Arranged above the feeding device 1 is a charging device 13, which comprises a chain 14 of transversely lying troughs 15 which is moved is a direction perpendicular to the direction of movement of the feeding device and which is provided with a mechanism (not shown) for the tilting of the troughs 15 about their longitudinal axis. The speed of the chain 14 is so matched with that of the feed chute 6 that the tilting mechanism for the individual troughs 15 is set into operation each time a support element 7 of the bottom belt 4 is disposed underneath the troughs 15.

Figure 1:
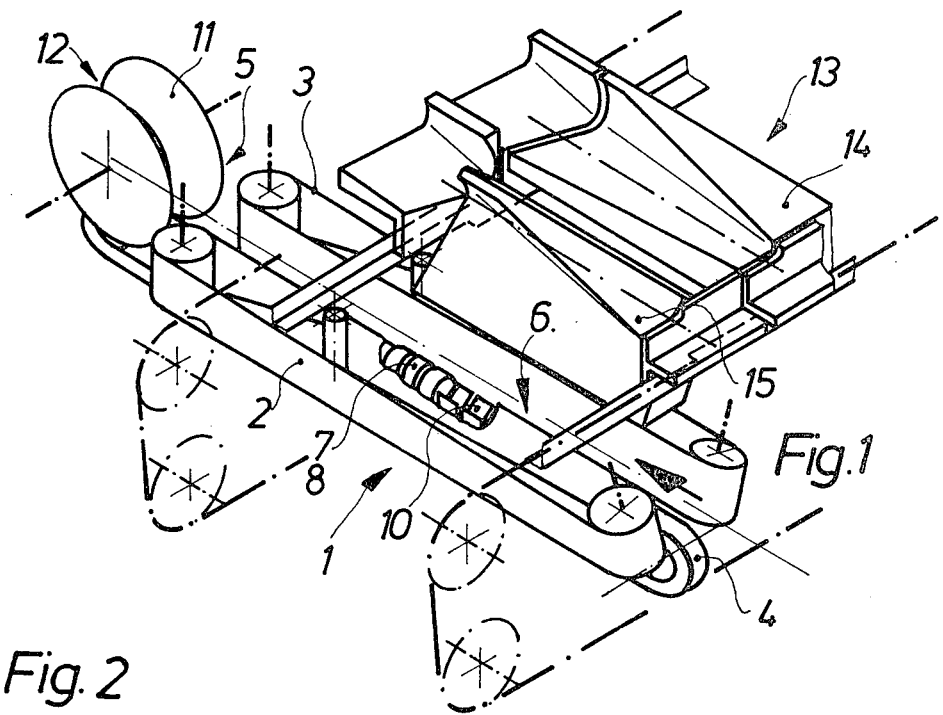
FIG. 1 shows an overall axonometric view of the charging and feeding device.

The manner of operation of the appratus is as follows: The unbeheaded fish to be processed are laid into the troughs 15 of the circulatingly driven trough chain 14 of the charging device 13 with their heads towards the left of FIG. 1 and backs against the conveying direction and are beheaded by means of a suitable tool. The troughs 15 carrying the fish rumps 16 then, in the further course of the conveying get into the region above the feed chute 6 of the feeding device 1 and are tilted about their longitudinal axis by the tilting mechanism. The speed of the chain 14 and of the bottom belt 4 are so matched to each other that a support element 7 of the bottom belt 4 is so disposed in the region of the tilted trough 15 at the instant of the actuation of the tilting mechanism that the thrown-down fish rump is caught at its abdominal cavity 17 by the support element 7. At the same time, the tail part 18 is supported by means of the receptacles 10 adjoining the support elements 7 and guided laterally through their V-shaped construction. The deposited fish rump 16, positioned in this manner, in the further course of its conveying by the bottom belt 4 and the conveyor belts 2, 3 gets into the region of the holding-down member, formed by the profiled roller 11, which effects the pressing-down of the fish rump 16 by its abdominal cavity part onto the corresponding support element 7. By the resulting arching-in of the abdominal ceiling 19, the undersides of the vertrebral appendages 20 get indirectly by the abdominal ceiling 19 to bear against the support surface 8 of the support element 7 so that, in conjunction with the guidance of the fish rump 16 in the track profile 12 of the profiled roller 11, a setting-up and exact alignment of the fish rump takes place. The entrails displaced during this process penetrate in part into free spaces to both sides of the supporting surface 8 and are for the other part urged out of the open end cut-face of the abdominal cavity 17. The peripheral speed, which is preferably increased relative to that of the bottom belt 4, of the profile roller 11 facilitates the setting-up operation, since a state of sliding friction occurs in between the profile roller 11 and the fish to effect a largely unhindered deviation of the fish in correspondence with the setting-up or erecting forces acting on it. The synchronism between the bottom belt 4 and the trough chain 14 is so adjustable that each fish rump comes to lie with precision by its abdominal cavity 17 in the region of the support elements 7. In order to guide the tail part 18 of the fish rump effectively, a further holding-down member (not shown) in the shape of a back guide of known construction can be connected immediately behind the profile roller 11.

Apparatus embodying the present invention may be used to align fish rumps which are conveyed with their tail end leading. In that case, the support elements 7 may be provided as thrust or push saddles on a conveyor which represents the main conveyor of a processing machine connected therebehind.

What is claimed is:

1. A method for aligning beheaded fish, in particular fish with a cross-section approximating to circular shape such as fish of the various *gadidae* species, in respect of the position of its plane of symmetry, with conveying support of the fish body at its belly, back and flanks, wherein the support at the belly of the fish is performed by inwardly arching the abdominal walls enclosing the abdominal cavity up to nearly the bearing of their insides against the undersides of the vertebral projections.

2. An apparatus for performing an alignment of beheaded fish, in particular fish with a cross-section approximating to circular shape such as fish of the various *gadidae* species, in respect of the position of its plane of symmetry, with conveying support of the fish body at its belly, back and flanks, said apparatus comprising
    (a) feeding means including rotatably driven side conveyor belts and a bottom belt which together form feed chute means,
    (b) charging means for loading fish belly-side down into said feed chute means, and
    (c) hold-down means arranged above said bottom belt for pressing said fish downwardly in said chute means,
    (d) the bottom belt being provided with support elements, which
    (e) extend in a longitudinal direction with respect to the conveyance of the fish,
    (f) are formed with a convex upper support surface lying in symmetry with the axis of symmetry of said feed chute means and projecting upwardly within said feed chute means,
    (g) said charging means being adapted to load said fish into said feed chute means with the convex support surfaces of said support elements underlying the belly cavity of the fish, and said support elements being sized to cause the abdominal walls enclosing said belly cavity to arch upwardly into said belly cavity into proximity to the vertebral projections of the fish, under downward pressure of said hold-down means.

3. An apparatus as claimed in claim 2, wherein said charging means include transversely arranged troughs to drop fish into said feeding means cyclically, and in which said support elements are spaced from each another in a row along the longitudinal axis of said bottom belt.

4. An apparatus as claimed in claim 2, wherein said support surface is constructed as part of the envelope of a cylinder, the diameter of which is smaller than the distance between the lower edges of the said side conveyor belts forming said feed chute means.

5. An apparatus as claimed in claim 3, wherein the length of said support surface corresponds to at least the length of the abdominal cavity of the largest fish to be processed.

6. An apparatus as claimed in claim 2, wherein said support elements are arranged at a spacing from one another which corresponds to at least the length of the tail part of the largest fish to be processed.

7. An apparatus as claimed in claim 2 wherein said support elements are spaced from each other, and wherein the portions of the bottom belt, which are disposed between said support elements, are stepped to a lower height relative to the support surfaces and form a trough-shaped structure of V-shaped cross-section.

8. An apparatus as claimed in claim 2, wherein said charging means and said feeding means are synchronized in respect of their conveying speeds.

9. An apparatus as claimed in claim 2, wherein said hold-down means are arranged adjacent the outlet end of said feed chute means and comprise a profiled roller of a V-shaped track profile driven at a peripheral speed corresponding to at least the speed of said conveyor belts and constructed to be biassed upwardly.

10. An apparatus as claimed in claim 2, wherein a resiliently biassed guide for holding down the tail part of the fish is arranged downstream of said hold-down member.

11. An apparatus as claimed in claim 2, wherein said bottom belt forms part of the conveying means of a processing machine and is constructed as push saddle means.

* * * * *